UNITED STATES PATENT OFFICE 2,555,466

FOOD COMPOSITIONS

Herman H. Bogin and Rufus D. Feick, Detroit, Mich., assignors to Parke, Davis & Company, Detroit, Mich., a corporation of Michigan No Drawing. Application July 16, 1949,
Serial No. 105,275

4 Claims. (Cl. 99—71)

This invention relates to improvements in dry comminuted food products. More particularly the invention relates to dry, stable, non-toxic and non-hygroscopic food products containing a food which in dry powdered form is normally hygroscopic. The term "food," as used herein, is to be interpreted in its generic sense; that is, it includes beverages as well as solid foods.

Comminuted food products tend to lump or cake and thereby lose their free-flowing ability. Moreover, the absorption of moisture often results in loss of flavor and deterioration of the food product.

Food products such as soluble coffee and related coffee-like beverages in the concentrated powdered form, malted milk powders, dehydrated eggs and dehydrated milk and related products used as infant foods are usually hygroscopic and tend to cake or gum up when stored under normal atmospheric conditions. This loss of free-flowing solid properties present difficulties in handling and often decreases the rate of solubility when reconstitution of a solution of the solid product is desired. In addition the quality and flavor of such food products sometimes deteriorates upon standing We have discovered a means whereby foods which are normally hygroscopic in their dry powdered form may be converted to fine, free-flowing, stable, non-toxic and non-hygroscopic powdered food products. Our invention consists in forming an aqueous mixture of polyvinyl alcohol and a food which is normally hygroscopic in dry powdered form, evaporating the water therefrom and comminuting the dry mass thus obtained. The polyvinyl alcohol is in intimate mixture with the dried food and serves to protect it against deterioration.

These new powdered products are dry, stable, non-toxic and non-hygroscopic. They may be handled with facility because of their free-flowing properties. They remain in the dry state even when subjected to conditions of moisture sufficient to cause the dried food products alone to cake or gum up. The flavor and readiness of solubility are retained for long periods of time.

Soluble coffee, as well as related types of beverages in the solid form, when treated according to the process described in this invention, are fine, free-flowing, non-hygroscopic powders and retain the original flavor of the food product over a long period of time. Dehydrated eggs are well protected against deterioration when processed as described herein. Dried milk products do not cake upon exposure to moist air or upon standing when similarly incorporated with the polyvinyl alcohol.

The amount of polyvinyl alcohol to be used with a particular material depends somewhat on the hygroscopicity of the substance. In general, it may vary from as little as 2% by weight to as high as 60% by weight but usually the polyvinyl alcohol is between about 10% and 50% by weight.

In preparing the products of this invention, the food product is mixed intimately with an aqueous solution of polyvinyl alcohol, powerful stirring devices, blending machines, colloid mills or homogenizers being used to accomplish thorough mixing. The resulting mixture is dried. Although various methods of drying can be used, the preferred process is carried out in vacuum and at a low enough temperature to prevent decomposition. In some cases spray drying is used to advantage. The solid residue is pulverized to the desired mesh.

The following examples are illustrative.

Example 1

2.2 parts of polyvinyl alcohol are dissolved in 17.8 parts of hot water and to the solution is added a solution of 20 parts of soluble coffee dissolved in 50 parts of hot water. After thorough mixing the combination is dried in a vacuum drier. The resulting dried material is ground to a fine powder which is non-hygroscopic and maintains its free-flowing properties in an atmosphere sufficiently moist to result in ordinary soluble coffee caking up to a hard solid.

Example 2

The contents of three eggs, representing about 40 grams of egg solids, are beaten up in a mechanical blender. A solution of 4.4 grams of dry polyvinyl alcohol in 100 grams of water is mixed thoroughly with the beaten eggs and the mixture frozen at —40° C. for twenty-four hours. The frozen mixture is then dried at 40° C. and 2–3 mm. pressure. The resulting solid, consisting of 10% polyvinyl alcohol and 90% dried egg, is ground to a fine free-flowing powder. This powder is non-hygroscopic and the egg contained therein does not deteriorate or lose its flavor under normal conditions of storage.

Example 3

The beaten contents of three eggs are mixed with 40 grams of polyvinyl alcohol dissolved in 800 grams of water. Drying is effected as in Example 2. The final powder consists of 50% polyvinyl alcohol and 50% dried egg.

Example 4

400 parts of milk (about 50 parts solid) are mixed with a solution of 13 parts of polyvinyl alcohol in 245 parts of water. The mixture is dried in vacuo at 55° C. and 30 mm. pressure. The resulting solid is hard and brittle and is readily powdered. The yield is 51 parts and consists of 20% polyvinyl alcohol and 80% dry milk. The product is a free-flowing, non-hygroscopic, stable powder.

Example 5

2.2 parts of polyvinyl alcohol are dissolved in 17.8 parts of hot water and to the solution is added a solution of 20 parts of cereal beverage dissolved in 50 parts of hot water. After thorough mixing the combination is dried in a vacuum drier. The resulting solid material is ground to a powder. This powder is non-hygroscopic and retains its flavor over long periods of time.

What we claim as our invention is:

1. A non-hygroscopic free-flowing solid food product comprising an intimate mixture of a food product which in dry powdered form is normally hygroscopic and polyvinyl alcohol.

2. A solid food product comprising a food which in dry powdered form is normally hygroscopic and 10 to 50% by weight of polyvinyl alcohol.

3. The method of stabilizing a food product which in dry powdered form is normally hygroscopic which comprises forming an aqueous mixture of said food product and polyvinyl alcohol, evaporating the water therefrom and comminuting the dry mass.

4. A soluble coffee product comprising an intimate mixture of a normally hygroscopic powdered coffee product and polyvinyl alcohol.

HERMAN H. BOGIN.
RUFUS D. FEICK.

REFERENCES CITED

The following references are of record in the file of this patent:

UNITED STATES PATENTS

| Number | Name | Date |
|---|---|---|
| 1,883,150 | Washburn | Oct. 18, 1932 |
| 2,393,561 | Perech | Jan. 22, 1946 |

OTHER REFERENCES

The Condensed Chemical Dictionary, 3rd ed., p. 517.